(12) United States Patent
Fontana et al.

(10) Patent No.: US 7,079,354 B1
(45) Date of Patent: Jul. 18, 2006

(54) PLANAR MAGNETIC HEAD

(75) Inventors: Robert E. Fontana, San Jose, CA (US); Richard Hsiao, San Jose, CA (US); Yuexing Zhao, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 252 days.

(21) Appl. No.: 09/638,663

(22) Filed: Aug. 14, 2000

(51) Int. Cl.
*G11B 5/147* (2006.01)
(52) U.S. Cl. .................................. 360/126
(58) Field of Classification Search .......... 360/126, 360/317
See application file for complete search history.

(56) References Cited

U.S. PATENT DOCUMENTS

| | | |
|---|---|---|
| 4,949,207 A | 8/1990 | Lazzari |
| 5,793,578 A | 8/1998 | Heim et al. |
| 5,835,313 A | 11/1998 | Sato et al. |
| 5,837,392 A | 11/1998 | Katori et al. |
| 5,890,278 A | 4/1999 | Van Kesteren |
| 5,935,644 A | 8/1999 | Heim et al. |
| 6,317,288 B1 * | 11/2001 | Sasaki .................. 360/317 |

FOREIGN PATENT DOCUMENTS

JP      51-149019      12/1976

OTHER PUBLICATIONS

IBM Technical Disclosure Bulletin, Magnetoresistive Head with a Recession of the Magnetoresistive Element, vol. 40, No. 04 Apr. 1997.

* cited by examiner

*Primary Examiner*—A. J. Heinz
(74) *Attorney, Agent, or Firm*—Robert O. Guillot; Intellectual Property Law Offices

(57) ABSTRACT

A magnetic head including a second magnetic pole (P2 pole) that is fabricated upon a write gap layer that is deposited upon a flat surface. To achieve the flat surface, a P1 pole pedestal is formed upon the P1 pole layer with a sufficient thickness that the induction coil structure can be fabricated beneath the write gap layer. In the preferred embodiment, an etch stop layer is formed upon the P1 pole layer and an ion etching process is utilized to form the induction coil trenches in an etchable material that is deposited upon the etch stop layer. Following the fabrication of the induction coil structure a CMP process is conducted to obtain a polished flat surface upon which to deposit the write gap layer, and the P2 pole is then fabricated upon the flat write gap layer.

8 Claims, 5 Drawing Sheets

PLANAR MAGNETIC HEAD

BACKGROUND OF THE INVENTION

1. Field of the Invention

The present invention relates generally to magnetic heads for hard disk drives, and more particularly to magnetic heads having planar P2 poles and methods for fabricating such heads.

2. Description of the Prior Art

A well known method for increasing the areal data storage density on magnetic hard disks is to fabricate the magnetic data recording head with a narrower P2 pole tip, such that a narrower data track is written by the head. However, in typical magnetic heads, the fabrication of the induction coils of the head results in an uneven topology upon which the P2 pole is fabricated. As a result of the uneven topology, the fabrication of the P2 pole tip is affected, in that it is more difficult to reliably create the narrow pole tip dimensions that are desired. Thus fabrication of narrower P2 pole tips will be made easier where the P2 pole, including the P2 pole tip and the yoke portions of the P2 pole, are fabricated on a planar surface. As is described herebelow, the present invention includes fabrication steps that provide a planarized surface upon which the P2 pole and P2 pole tip are fabricated.

SUMMARY OF THE INVENTION

The magnetic head of the present invention, includes a second magnetic pole (P2 pole) that is fabricated upon a write gap layer that is deposited upon a flat surface. To achieve the flat surface, a P1 pole pedestal is formed upon the P1 pole layer with a sufficient thickness that the induction coil structure can be fabricated beneath the write gap layer. In the preferred embodiment, an etch stop layer is formed upon the P1 pole layer and an ion etching process is utilized to form the induction coil trenches in an etchable material that is deposited upon the etch stop layer. Following the fabrication of the induction coil structure a CMP process is conducted to obtain a polished flat surface upon which to deposit the write gap layer, and the P2 pole is then fabricated upon the flat write gap layer.

The magnetic head of the present invention can be reliably fabricated with a more narrow P2 pole tip base width, such that data tracks written by the magnetic head are likewise narrower. A hard disk drive including the magnetic head of the present invention therefore possesses narrower written data tracks, such that the areal data storage density of the hard disk drive is increased.

It is an advantage of the hard disk drive of the present invention that it possesses increased areal data storage density.

It is another advantage of the hard disk drive of the present invention that data is written with narrower data track widths upon the disk media of the hard disk drive.

It is an advantage of the magnetic head of the present invention that it includes a P2 pole that is fabricated upon a flat surface.

It is another advantage of the magnetic head of the present invention that it is fabricated with a flat write gap layer, whereby the P2 pole, and including the P2 pole tip is fabricated upon a flat surface.

It is a further advantage of the magnetic head of the present invention that it is fabricated with an induction coil structure that is disposed beneath the write gap layer, whereby the write gap layer is fabricated upon a flat surface and the P2 pole is fabricated upon the flat write gap layer.

It is an advantage of the method for fabricating a magnetic head of the present invention that a flat surface is provided for the fabrication of the P2 pole thereon.

It is another advantage of the method for fabricating a magnetic head of the present invention that the induction coil structure is fabricated beneath the write gap layer, and a flat write gap layer is fabricated thereon, such that the P2 pole can be fabricated on the write gap layer.

It is a further advantage of the method for manufacturing a magnetic head of the present invention that a P1 pole pedestal is fabricated upon a P1 pole, such that the induction coil structure can be fabricated beneath the write gap layer, and a flat write gap layer can be fabricated thereon, and a flat P2 pole can be fabricated on the write gap layer.

These and other features and advantages of the present invention will no doubt become apparent to those skilled in the art upon reading the following detailed description which makes reference to the several figures of the drawings.

IN THE DRAWINGS

FIGS. 12 and 13 are end cross-sectional views of further fabrication steps of the present invention, wherein FIG. 12 is taken along lines 12—12 of FIG. 11;

FIGS. 15 and 16 are end cross-sectional views depicting further fabrication steps of the present invention, wherein FIG. 15 is taken along lines 15—15 of FIG. 14.

DETAILED DESCRIPTION OF THE PREFERRED EMBODIMENTS

Figure 1:
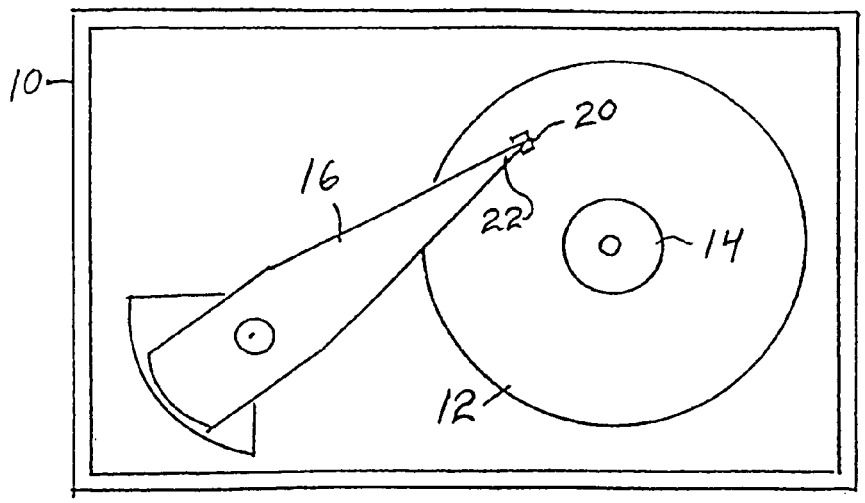
FIG. 1 is a simplified depiction of a hard disk drive of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disks 12 rotate upon the spindle 14 and the magnetic heads 20 are contained in air bearing sliders that are adapted for flying above the surface of the rotating disks. Such sliders include a substrate base upon which the various layers and structures that form the magnetic head are fabricated. Such heads are fabricated in large quantities upon a wafer substrate and subsequently sliced into discrete magnetic heads 20.

Figure 2:
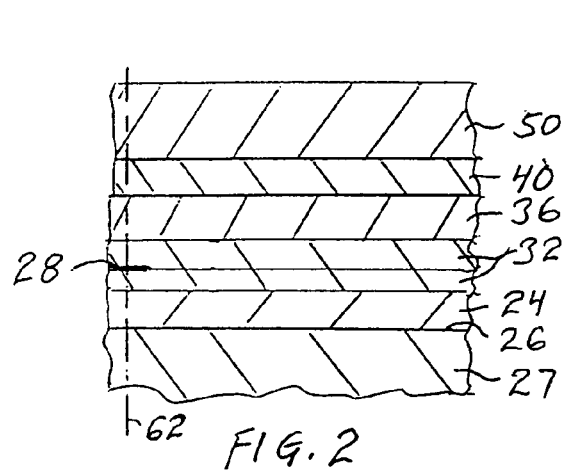
FIG. 2 is a side cross-sectional view of a fabrication step of the magnetic head of the present invention which serves as a starting point for the detailed description thereof.

FIG. 2 is a side cross-sectional view of the magnetic head 20 at an appropriate fabrication stage to commence the discussion of the present invention. This fabrication stage is well known to those skilled in the art, and it includes a read head magnetic shield (S1) layer 24 that is fabricated upon the upper surface 26 of a wafer substrate 27; a read head element 28 that is fabricated within insulative layers 32 upon the S1 shield 24, and a second magnetic shield (S2) layer 36 that is fabricated upon the insulative layers 32. A further insulative layer 40 is deposited upon the S2 shield 36 and a first magnetic pole (P1) 50 is next fabricated upon the insulative layer 40. As is also well known to those skilled in the art, in a type of magnetic head termed a merged head, the P1 pole layer 50 and the S2 shield layer 36 are merged into a single layer that performs the functions of the S2 shield 36 when the head is reading data from a hard disk, and performs the function of the P1 magnetic pole layer when the magnetic head is writing data to a hard disk. The insulative layer 40 is not present in such a merged head. The present invention, as is next discussed in detail, may be fabricated as a standard magnetic head or as a merged magnetic head, as will be clear to those skilled in the art upon reading further.

Figure 4:
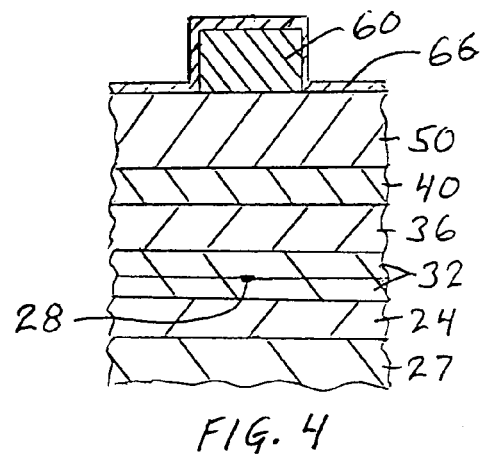
FIG. 4 is an end cross-sectional view of the device depicted in FIG. 3, taken along lines 4—4 of FIG. 3.
Figure 3:
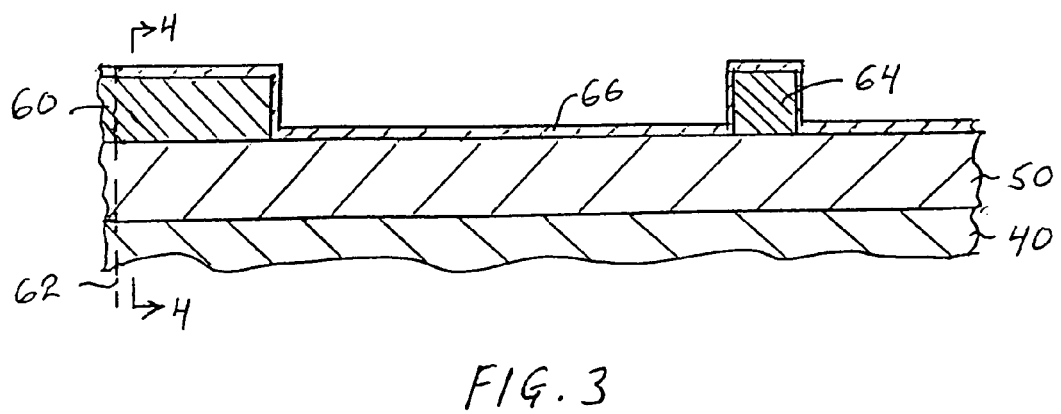
FIG. 3 is a side cross-sectional view depicting the fabrication of the P1 pedestal of the present invention.

The next step in the fabrication of the magnetic head 20 of the present invention is the creation of a stepped P1 pole as is depicted in FIGS. 3 and 4, wherein FIG. 3 is a side cross-sectional view and FIG. 4 is an end elevational view taken along lines 4—4 of FIG. 3. The stepped P1 pole is created by fabricating an additional raised P1 pole segment or pedestal 60 in magnetic connection with the P1 pole layer 50 proximate the ABS surface 62 of the magnetic head 20. Additionally, a P1 pole back gap piece 64 is also fabricated in magnetic connection with the P1 pole layer 50. The P1 pole pedestal 60 and back gap piece 64 may be fabricated utilizing a patterned photoresist and well known photolithographic techniques to plate the pedestal 60 and back gap piece 64 onto the P1 layer 50. Where the photolithographic techniques are utilized, the pedestal 60 and back gap piece 64 may be fabricated from the same material as the P1 layer, such as Permalloy, or they may be fabricated from another magnetically conductive material, such as NiFe 45/55 which has different magnetic conductive properties from Permalloy, and thus provides different performance characteristics to a magnetic head that is fabricated using it. Alternatively, the P1 pedestal 60 and back gap piece 64 can be created by first fabricating a thick P1 layer and then selectively etching away portions of the P1 layer while masking the pedestal 60 and back gap piece 64, until suitable pedestal thickness is obtained. As is more fully described herebelow, the thickness of the pedestal 60 is generally at least equal to the thickness of induction coil members that are subsequently fabricated within the magnetic head 20, as are described herebelow. As depicted in FIG. 4, the pedestal 60 is generally fabricated centrally above the read head element 28, and the width of the pedestal 60 is not a critical dimension if fabricated generally in the proportions shown in the drawings. Following the fabrication of the P1 pedestal 60, an insulation layer 66 is deposited upon the surface of the device. As will become clear upon further reading, the insulation layer 66 acts as an etch stop layer in a subsequent fabrication step; therefore, the composition of the insulation layer 66 is determined in part by the composition of other material layers that are described herein.

Figure 5:
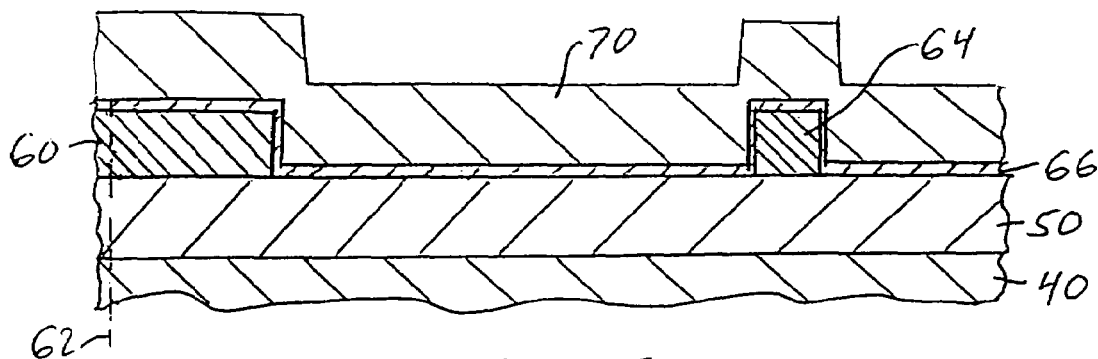
FIGS. 5–11 are side cross-sectional views depicting further fabrication steps of the present invention.
Figure 6:
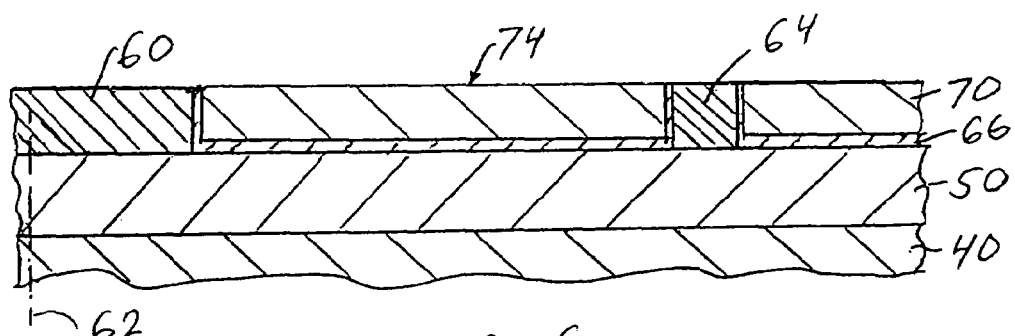
Figure 7:
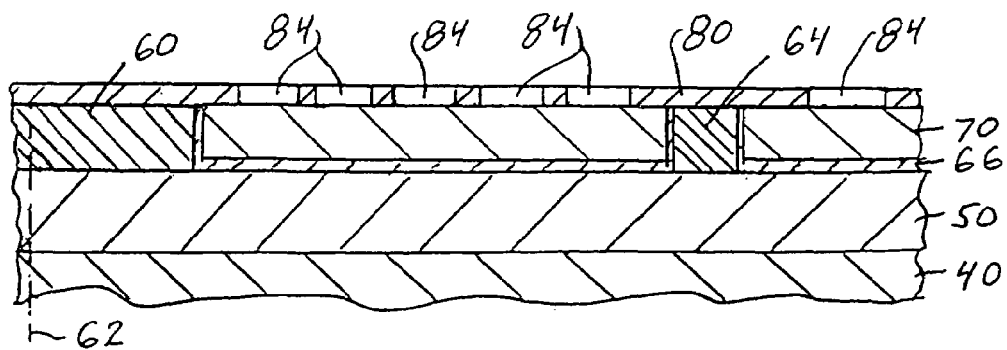

As depicted in FIG. 5, a further layer 70 of dielectric or insulative material is deposited on top of the etch stop layer 66. The thickness of the layer 70 is greater than the thickness of the P1 pedestal 60 in that a chemical mechanical polishing (CMP) step, as depicted in FIG. 6 is next performed. The purpose of the CMP step is to create a flat surface 74 upon the wafer substrate, including the dielectric layer 70, P1 pedestal 60 and back gap piece 64 as shown in FIG. 6. Thereafter, as depicted in FIG. 7, a patterned etch mask 80 is fabricated upon the Nat surface 74. The patterned mask includes openings 84 for fabricating induction coil trenches as are next described.

Figure 8:
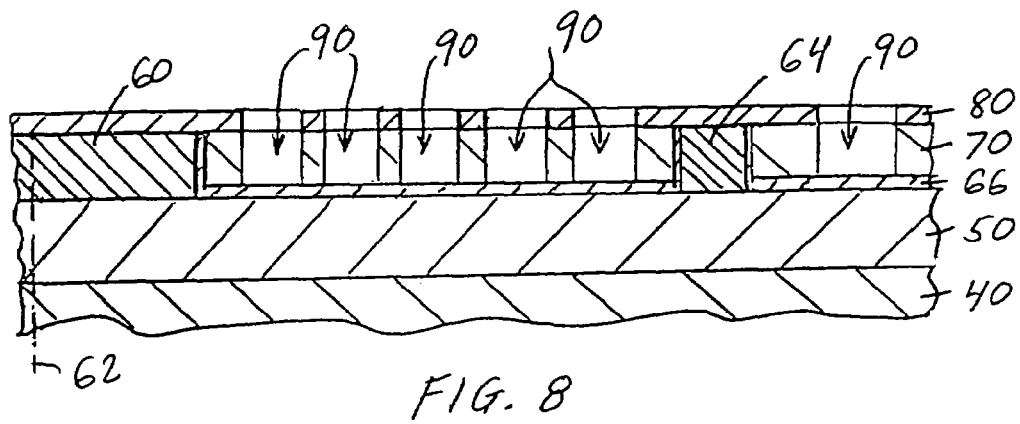

As depicted in FIG. 8, utilizing an ion etch process which is preferably a reactive ion etch (RIE) process, induction coil trenches 90 are etched through the dielectric layer 70 to the etch stop layer 66. Therefore, the relationship of the materials which comprise the etch stop layer 66 and the dielectric layer 70 must be such that during the RIE step the material comprising layer 70 is etched, while the material comprising the etch stop layer 66 is not etched. By way of example, where the layer 70 is composed of an organic polymer such as a hard baked resist, a reactive ion etch process utilizing a gas such as oxygen can be utilized and the etch stop layer 66 may consist of a substance that is substantially more difficult to etch, such as $SiO_2$ or $Al_2O_3$. Accordingly, where the dielectric layer 70 is composed of $SiO_2$, the etch stop layer 66 is preferably composed of $Al_2O_3$ and a gas such as fluorine is utilized in the RIE process.

Figure 9:
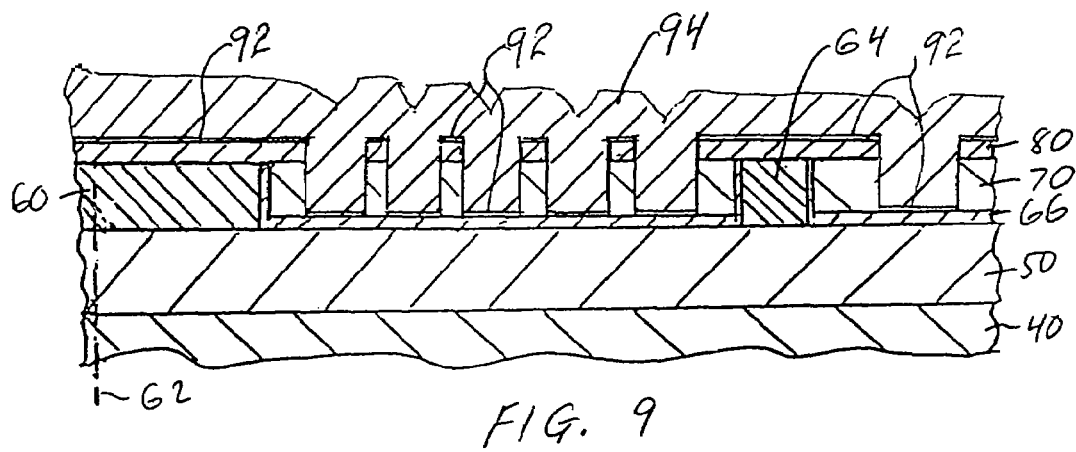

Thereafter, as depicted in FIG. 9, a seed layer 92 is next deposited onto the substrate and into the coil trenches 90. As is known in the art, a typical seed layer 92 is preferably a sputter deposited dual layer composed of a tantalum initial sublayer part and a copper subsequent sublayer part.

Figure 10:
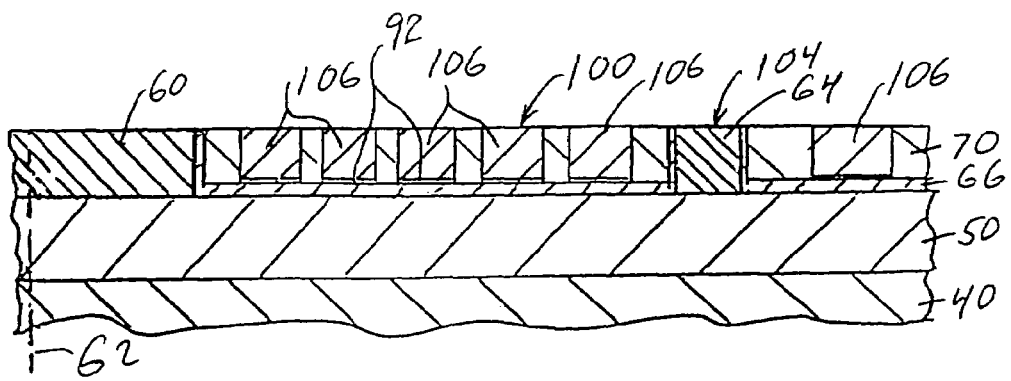

An induction coil structure is then fabricated by depositing induction coil material 94 into the coil trenches 90. It is significant to note that the etch stop layer 66 is electrically insulative to prevent the shorting out of the induction coil traces. The induction coil is typically composed of copper, and is fabricated in a standard electrodeposition process that is well known to those skilled in the art. Thereafter, as depicted in FIG. 10, a second CMP process step is conducted to remove the excess copper and the RIE mask 80, such that a flat upper surface 100 is formed. It is significant to note that the upper surface 104 of the back gap piece 64 is exposed in this CMP process. The seed layer 92 and induction coil traces 106 remain in the trenches 90.

Figure 11:
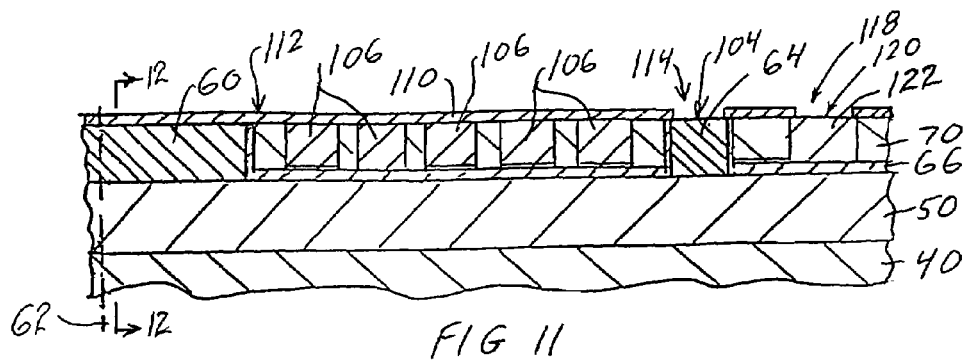
Figure 12:
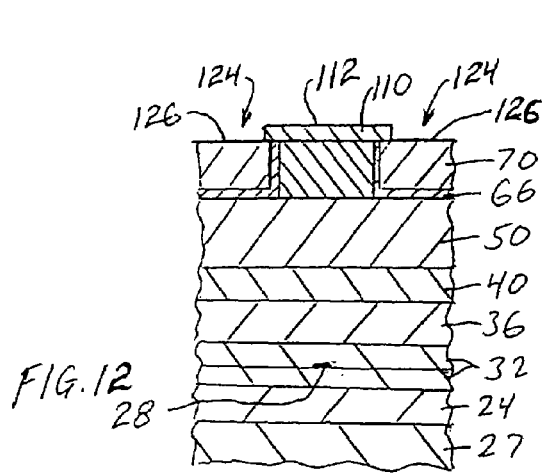

As depicted in FIGS. 11 and 12, a patterned write gap layer 110 is next deposited upon the flat surface 100, such that the write gap layer 110 is formed with a flat upper surface 112. FIG. 11 is a side cross-sectional view similar to FIGS. 2, 3 and 5–10, and FIG. 12 is an end cross-sectional view taken along lines 12—12 of FIG. 11 and similar to FIG. 4. The patterning of the write gap layer 110 provides an opening 114 to expose the upper surface 104 of the back gap piece 64, an opening 118 to expose the upper surface 120 of a central induction coil trace pad 122 for a subsequent electrical connection thereto, as is well known to those skilled in the art, and openings 124 on each side of the P2 pole tip location (described below) to expose the upper surface 126 of the insulative layer 70 at the ABS surface 62. Thereafter, as depicted in the end cross-sectional view of FIG. 13, a patterned photoresist 128 is fabricated upon the flat upper surface 112 of the write gap layer 110 as a part of standard photolithographic steps for the plating up of the P2 pole, including the P2 pole tip. The patterned photoresist 128 thus includes a P2 pole tip trench 129. Portions of the patterned photoresist 128 are formed upon the upper surface 126 of the insulative layer 70, as seen in FIG. 13.

Figure 13:
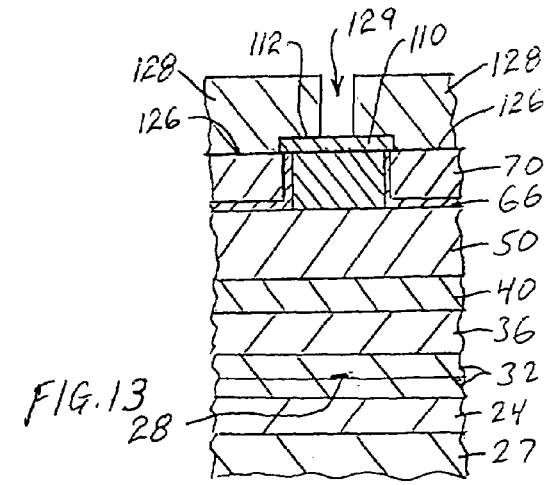
Figure 14:
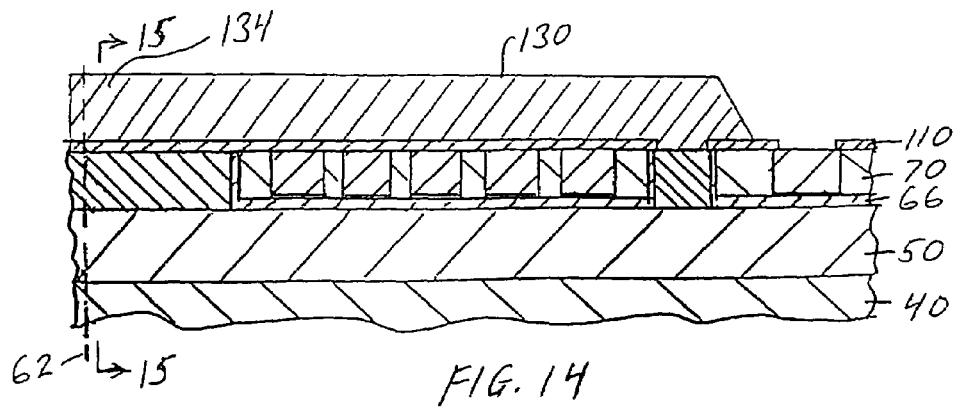
FIG. 14 is a side cross-sectional view of a further fabrication step of the present invention.
Figure 15:
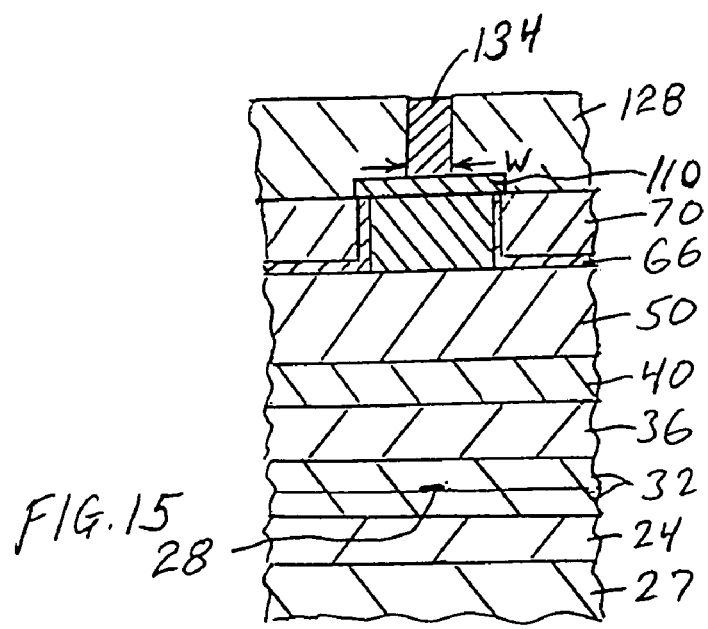
Figure 16:
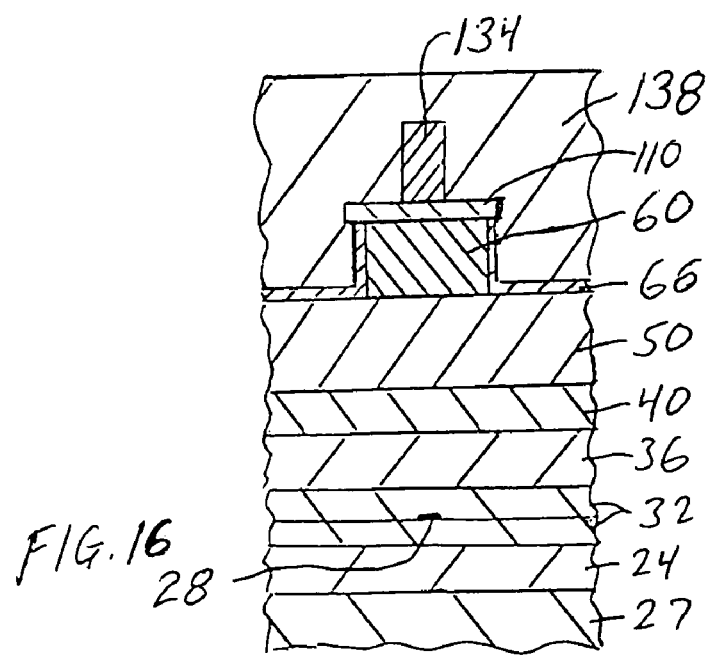

The fabricated P2 pole 130 is depicted in FIGS. 14 and 15, wherein FIG. 14 is a side cross-sectional view similar to FIG. 12, and FIG. 15 is an end cross-sectional view similar to FIG. 13. As depicted in FIGS. 14 and 15, the P2 pole 130 including a P2 pole tip portion 134 is fabricated onto the trench 129 upon the flat write gap layer 110. As is best seen in FIG. 15, the P2 pole tip 134 is generally centrally disposed relative to the P1 pedestal 60 and in alignment with the read head element 28. As depicted in FIG. 16, following the fabrication of the P2 pole 130, the patterned photoresist 128 is removed, typically by a wet chemical process. Significantly, the insulative layer 70 at the ABS surface 62 is also removed in the wet chemical photoresist removal process. Thereafter, as depicted in FIG. 16, the head is encapsulated in a suitable dielectric 138 such as alumina, and further standard fabrication steps (not shown) are conducted to produce a completed magnetic head 20. In this embodiment only one dielectric material, the alumina 138, is exposed at the ABS surface 62, such that a subsequent ABS lapping process can be optimized more easily, as will be understood by those skilled in the art.

As was indicated hereabove, the width W of the base of the P2 pole tip (P2W) 134 is a significant operational parameter for magnetic heads, and the narrower that P2W can be fabricated, the greater the areal data storage density on a disk medium can be made. The photolithographic fabrication techniques described herein that are utilized to fabricate the P2 pole tip can more reliably obtain narrow P2W widths in a manufacturing environment because the P2 pole, including the P2 pole tip, is fabricated upon a flat write gap layer surface. The utilization of the stepped P1 pole pedestal of the present invention allows the induction coil traces to be fabricated beneath the write gap layer, such that the write gap layer can be deposited on a flat surface and the P2 pole, and particularly the P2 pole tip, are then fabricated upon the flat write gap layer. The magnetic head 20 of the present invention is thereby more reliably fabricated with a narrow P2W width. As a result, the data track written by the head 20 is narrower and therefore the areal data storage density of the magnetic medium is increased. A hard disk drive that includes the magnetic head 20 of the present invention therefore has a greater data storage capacity.

While the invention has been shown and described with regard to certain preferred embodiments, it is to be understood that those skilled in the art will no doubt devise certain alterations and modifications in form and detail hereof that nevertheless include the true spirit and scope of the invention. It is therefore intended that the following claims cover all such alterations and modifications hereof which nevertheless include the true spirit and scope of the invention.

What is claimed is:

1. A magnetic head, comprising:
a substrate;
read head elements being fabricated upon said substrate;
a P1 pole being fabricated upon said read head elements;
a P1 pole pedestal being disposed upon said P1 pole in magnetic connection therewith;
an etch stop layer being disposed upon said P1 pole;
an induction coil structure being fabricated upon said etch stop layer;
a flat upper surface being formed upon said P1 pedestal and said induction coil structure;
a write gap layer being disposed upon said flat upper surface; and
a P2 pole, including a body portion and a P2 pole tip portion, being disposed upon said write gap layer.

2. A magnetic head as described in claim 1 wherein said write gap layer is substantially flat.

3. A magnetic head as described in claim 2 wherein said P1 pedestal is approximately the same thickness as a thickness of said induction coil structure.

4. A magnetic head as described in claim 2 wherein a back gap piece is disposed upon said P1 pole in magnetic connection therewith.

5. A hard disk drive comprising:
a motor for rotating a spindle;
a magnetic medium disk mounted on said spindle;
an actuator assembly including a magnetic head for writing magnetic information on said disk, said magnetic head including:
a substrate;
read head elements being fabricated upon said substrate;
a P1 pole being fabricated upon said read head elements;
a P1 pole pedestal being disposed upon said P1 pole in magnetic connection therewith;
an etch stop layer being disposed upon said P1 pole;
an induction coil structure being fabricated upon said etch stop layer;
a flat upper surface being formed upon said P1 pedestal and said induction coil structure;
a write gap layer being disposed upon said flat upper surface; and
a P2 pole, including a body portion and a P2 pole tip portion, being disposed upon said write gap layer.

6. A hard disk drive as described in claim 5 wherein said write gap layer is substantially flat.

7. A hard disk drive as described in claim 6 wherein said P1 pedestal is approximately the same thickness as a thickness of said induction coil structure.

8. A hard disk drive as described in claim 6 wherein a back gap piece is disposed upon said P1 pole in magnetic connection therewith.

* * * * *